3,663,545
DIMERIZATION OF ROSIN
Richard G. Sinclair and David A. Berry, Columbus, Ohio, and Walter H. Schuller and Ray V. Lawrence, Lake City, Fla., assignors to the United States of America as represented by the Secretary of Agriculture
No Drawing. Filed Apr. 9, 1970, Ser. No. 27,174
Int. Cl. C08h *11/04*
U.S. Cl. 260—99.5           9 Claims

ABSTRACT OF THE DISCLOSURE

Rosin of substantial resin-acid dimer content has been produced upon mixing a rosin dissolved in chlorinated solvent with either mono- or difluorophosphoric acid and reacting at relatively low temperatures for about 17 hours. Higher resin-acid dimer contents were obtained when boron trifluoride was bubbled through the resin solution prior to treatment with the fluorophosphoric acid selected.

---

A non-exclusive, irrevocable, royalty-free license in the invention herein described, throughout the world for all purposes of the United States Government, with the power to grant sublicenses for such purposes, is hereby granted to the Government of the United States of America.

The present invention relates to an improved process for the polymerization of rosin.

Partially dimerized rosin, usually referred to in patent literature as "polymerized rosin," has many advantages over unmodified rosin, such as higher melting points, higher viscosity, and greater stability toward oxidation. Rosin has been dimerized by many methods, including the use of phosphoric acid, sulfuric acid, zinc chloride, aluminum chloride, fluorosulfonic acid, boron trifluoride, fluoroboric acid, and sulfuric acid in the presence of fluorobenzene and fluorotoluene.

One of the principal problems of dimerizing rosin is to cause a high degree of dimerization to ensue without considerable loss in acid functionality of the rosin. Insofar as we are aware, the dimerization of rosin by the use of monofluorophosphoric acid and difluorophosphoric acid, however, is novel and we have found that by their use, unexpectedly favorable results are obtained insofar as the ease with which high dimer content can be obtained while maintaining a high acid number in the rosin. Other advantages of the method of this invention will be described later in the specificatons.

Now, in accordance with this invention, a rosin of substantial resin-acid dimer content can be produced by contacting 100 parts of rosin dissolved in 130 parts by volume of organic solvent, preferably chloroform, with about 66 parts by weight of either monofluorophosphoric or difluorophosphoric acid catalysts at a temperature of —10° to +65° C. for a period of 17 hours or longer. The range in the amount of fluorophosphoric acid is 40 to 80 parts by weight per 100 parts of rosin although the preferred amount of catalyst is about 66 parts by weight per 100 parts of rosin. The preferred temperature for the dimerization is from about 25° to 50° C. At lower temperatures the reaction rate becomes slow for economical operation, and at higher temperatures degradation of the products becomes severe. The reaction time, under the above preferred conditions, is chosen on the basis of desired dimer yield and economy of operation. It is an advantage of this invention that prolonged reaction times are not as detrimental to the product as with other dimerization catalysts, for example, zinc chloride, aluminum chloride, and boron trifluoride. In particular, when the above preferred conditions are adhered to, the rosin products have a high acid number despite longer contact times with the catalyst.

Following the reaction period, an inherent advantage is found in the ease with which the catalyst can be recovered or removed from the products. The catalysts can be removed from the bottom of the reaction vessel after sedimentation and reused or, alternatively, washed out by water or aqueous salt solution. An inherent advantage to the invention is the lack of emulsification that occurs between catalyst, rosin solution, and aqueous wash systems. This emulsification tendency is a common problem with other catalysts. The washed organic solution of dimerized rosin is easily stripped of solvent, when the above preferred conditions are adhered to, and further dried to yield a high-melting, lightly colored product of substantial dimer content.

A further object of our invention is to disclose the synergistic effect in promoting rosin dimerization of using a combination catalyst consisting of borontrifluoride and difluorophosphoric acid. Further in dimer yields can thereby be obtained under conditions which are otherwise disclosed in the foregoing specifications.

The following examples are presented to illustrate the processes of the invention and should not be interpreted as limiting the invention in any manner whatever.

EXAMPLE 1

A 1.50 g. quantity of abietic acid was dissolved in 20 ml. of chloroform and stirred for 5.0 hours at 40° to 45° C. with 1.0 g. of monofluorophosphoric acid. The products were then washed with water until the wash was neutral to litmus. The organic phase was stripped of solvent on a rotary evaporator, and the residue was dried overnight in vacuo at 60° C.—yield: 1.46 g.; acid number: 184; weight percent dimers by gas chromatography: 11 percent.

The balance of the material other than dimer is mostly unreacted abietic acid which can be recycled into the dimerization process.

EXAMPLE 2

A 1.50 g. quantity of abietic acid was dissolved in 20 ml. of chloroform and stirred for 5.0 hours at 40° to 45° C. with 1.0 g. of difluorophosphoric acid. After product isolation, as in Example 1, 1.48 g. of product was received—acid number: 180; weight percent dimers: 43 percent. Monomeric species are again mostly recyclable, unreacted abietic acid.

EXAMPLE 3

A 1.50 g. quantity of abietic acid was dissolved in 20 ml. of chloroform and stirred for 17.0 hours at 42° to 46° C. with 1.0 g. of difluorophosphoric acid. After product isolation, as in Example 1, 1.47 g. of light-yellow solid was obtained—acid number: 172; weight percent dimers: 56 percent.

EXAMPLE 4

A 1.51 g. quantity of abietic acid was dissolved in 20 ml. of chloroform at 40 to 45° C. Boron trifluoride gas was bubbled through the solution for approximately 15 seconds, then 1.0 g. of difluorophosphoric acid was added. Stirring and heating continued for 5.0 hours. After product isolation, as Example 1, 1.47 g. of product was obtained—acid number: 130; weight percent dimers: 66 percent.

We claim:
1. A process for dimerizing abietic acid, comprising:
 (a) mixing 100 parts by weight of abietic acid dissolved in about 130 parts by volume of chloroform, with about from 40 to 80 parts by weight of an acid type catalyst selected from the group consisting of mono- fluorophosphoric acid, and difluorophosphoric acid, and
(b) reacting the mixture for at least 17 hours at a temperature of about from −10° to 65° C. to produce a rosin of substantial resin-acid dimer content.

2. The process of claim 1 wherein the acid catalyst is monofluorophosphoric acid.

3. The process of claim 1 wherein the catalyst is difluorophosphoric acid.

4. A process for more efficiently dimerizing abietic acid, comprising:
(a) dissolving 100 parts by weight of abietic acid in 130 parts by volume of chloroform,
(b) bubbling boron trifluoride gas catalyst through the solution of (a) for about 15 seconds,
(c) mixing with about from 40 to 80 parts by weight of an acid type catalyst selected from the group consisting of monofluorophosphoric acid and difluorophosphoric acid, and reacting the mixture for at least 17 hours at a temperature of about from −10° to 65° C. to produce a rosin of high resin-acid dimer content.

5. The process of claim 4 wherein the catalyst is monofluorophosphoric acid.

6. The process of claim 4 wherein the catalyst is difluorophosphoric acid.

7. A process for enhancing the dimer acid content of rosin which comprises contacting 100 parts of rosin dissolved in 130 parts by volume of chloroform with about 66 parts by weight of an acid type catalyst selected from the group consisting of monofluorophosphoric acid, and difluorophosphoric acid, at a temperature of about from −10° to +65° C. for a period of at least 17 hours.

8. The process of claim 7 wherein the catalyst is monofluorophosphoric acid.

9. The process of claim 7 wherein the catalyst is difluorophosphoric acid.

References Cited

UNITED STATES PATENTS

| | | | |
|---|---|---|---|
| 2,108,928 | 2/1938 | Rummelsburg | 260—99.5 |
| 2,136,525 | 11/1938 | Rummelsburg | 260—99.5 |
| 2,328,681 | 9/1943 | Rummelsburg | 260—99.5 |
| 2,017,866 | 10/1935 | Morton | 260—99.5 |
| 2,409,248 | 10/1946 | Brooks et al. | 252—435 |
| 2,469,335 | 5/1949 | Johnson et al. | 252—435 |

DONALD E. CZAJA, Primary Examiner

W. E. PARKER, Assistant Examiner